Figure 6:
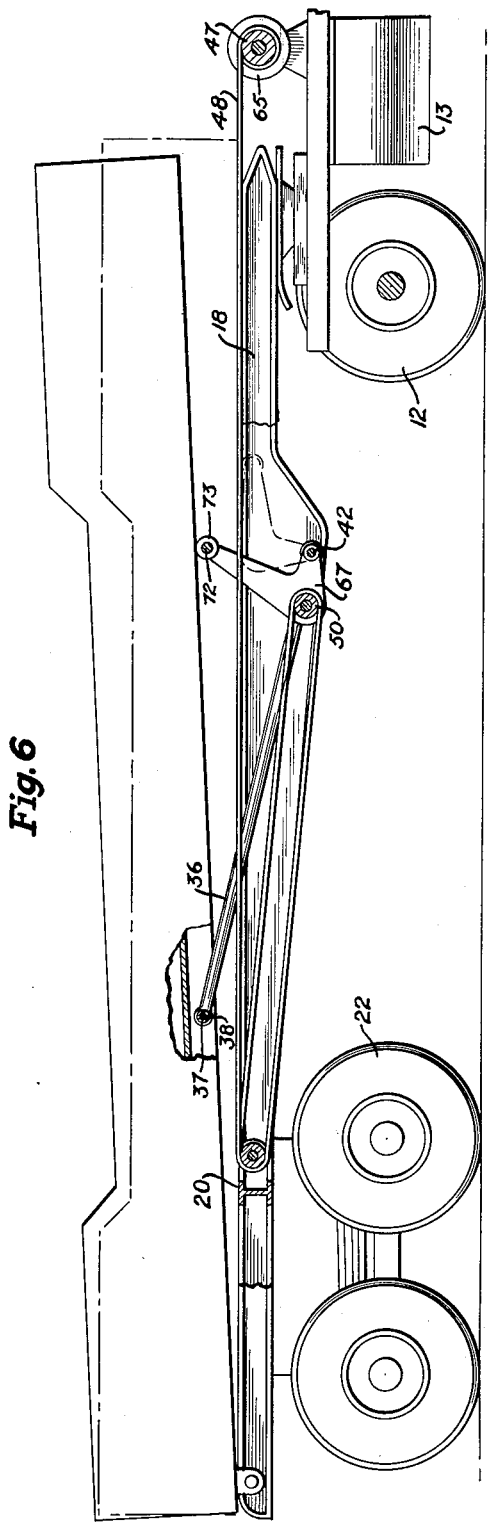

Sept. 20, 1955   B. G. BIRDWELL   2,718,429
VEHICLE DUMP UNIT WITH INITIAL LIFTING AID
Filed Dec. 3, 1954   3 Sheets-Sheet 1
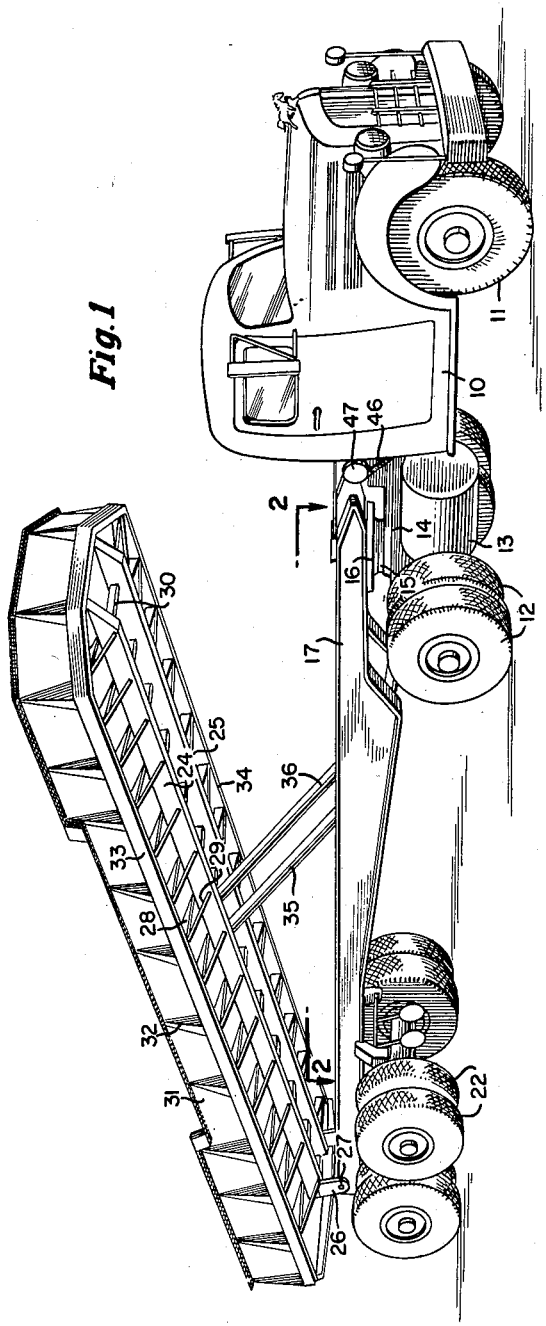
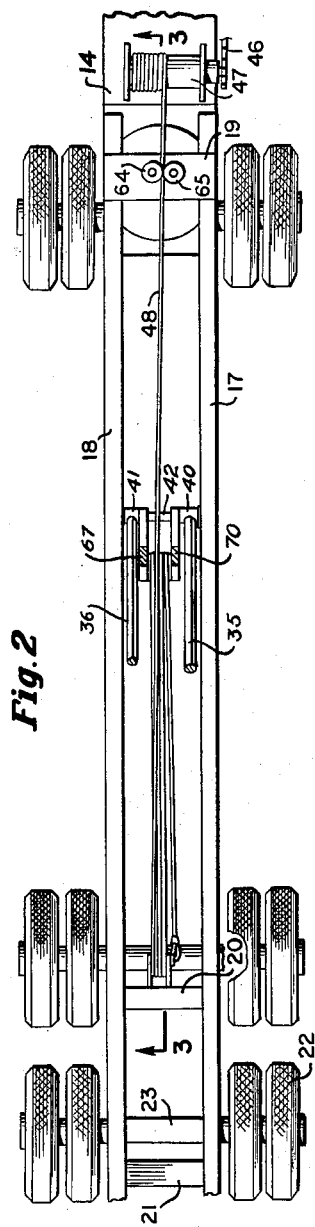
Inventor
Billy G. Birdwell
By *A. Yates Dowell*
Attorney Sept. 20, 1955  B. G. BIRDWELL  2,718,429
VEHICLE DUMP UNIT WITH INITIAL LIFTING AID
Filed Dec. 3, 1954  3 Sheets-Sheet 2
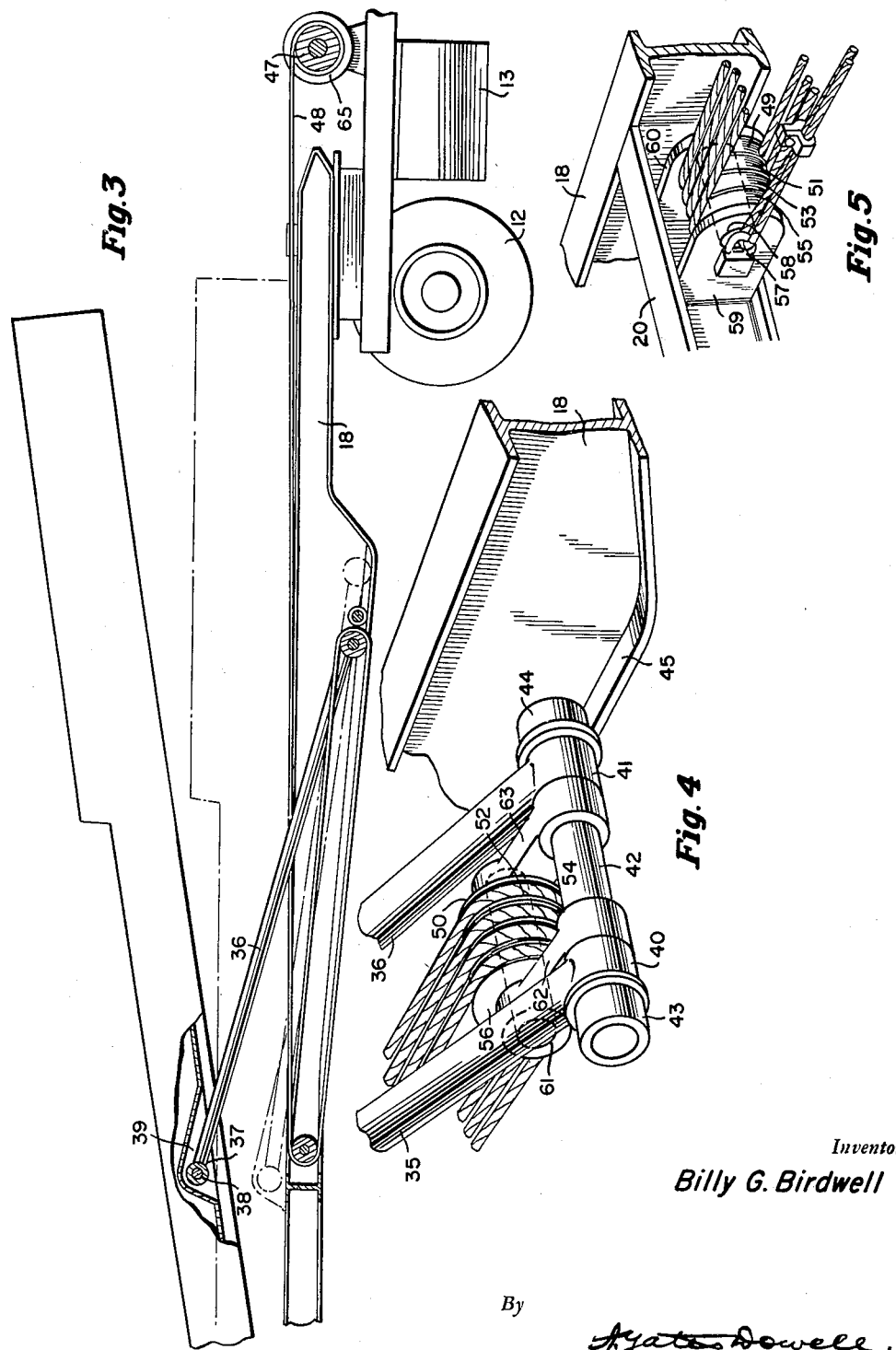
Inventor
Billy G. Birdwell
By
Attorney Sept. 20, 1955  B. G. BIRDWELL  2,718,429
VEHICLE DUMP UNIT WITH INITIAL LIFTING AID
Filed Dec. 3, 1954  3 Sheets-Sheet 3

Inventor
Billy G. Birdwell
By *A. Yates Dowell*,
Attorney

United States Patent Office 2,718,429
Patented Sept. 20, 1955

2,718,429

VEHICLE DUMP UNIT WITH INITIAL LIFTING AID

Billy G. Birdwell, Fort Stockton, Tex.

Application December 3, 1954, Serial No. 472,933

10 Claims. (Cl. 298—19)

This invention relates to the transportation of commodities and to vehicles and other equipment employed in hauling sand, gravel, and other loose substances in relatively large heavy loads where it is desirable to move the material rapidly in large quantities during excavating, building or other work.

The invention is particularly concerned with vehicles capable of hauling relatively large, heavy loads and capable of dumping or discharging a load in a minimum of time as for example, by tilting the vehicle body.

Vehicles having bodies or beds movable to discharge the contents of the same are old and well-known, however, difficulty has been experienced in insuring the discharge of all of the load without some small portion being retained, thereby reducing the efficiency of the operation. In vehicles of this kind usually the load is discharged over a relatively large area instead of over a relatively small area in a compact pile. Also prior vehicles have required extra parts or equipment, have been expensive, complicated and have included weaknesses reducing their strength and durability.

It is an object of the invention to overcome the above difficulties by providing a truck or tractor, and a trailer of simple relatively inexpensive strong, durable and efficient construction employing the conventional fifth wheel connection or coupling, and with a bed or body which can be tilted to quickly discharge the entire contents in a high pile and over a relatively small area.

Another object of the invention is to provide a trailer unit of simple, strong and durable construction, which on account of its fifth wheel construction can be quickly attached to or detached from a conventional truck or tractor and with such unit having a sub-frame supporting a body which can be removed and the sub-frame employed for hauling other materials.

A further object of the invention is to provide a trailer unit having a dump body and mechanism for moving the body for discharging completely a load, with such mechanism including a windlass mounted directly thereon or on a propelling truck or tractor, and in either case including force multiplication mechanism such as a cable with block and tackle for elevating the body to discharge the contents.

Other objects and advantages of the present invention will become apparent from the following description taken in conjunction with the drawings, wherein:

Fig. 1 is a perspective of a combination truck or tractor and trailer unit illustrating one application of the present invention and with the body raised slightly toward dumping position;

Fig. 2, a top plan view taken on the line 2—2 of Fig. 1;

Fig. 3, an enlarged fragmentary detail on the line 3—3 of Fig. 2;

Fig. 4, an enlarged fragmentary perspective of the lower end of the strut supporting structure and the group of pulleys or sheave wheels carried thereby;

Fig. 5, an enlarged fragmentary detail of a part of the intermediate portion of the sub-frame on which cooperating sheaves are mounted.

Figure 7:
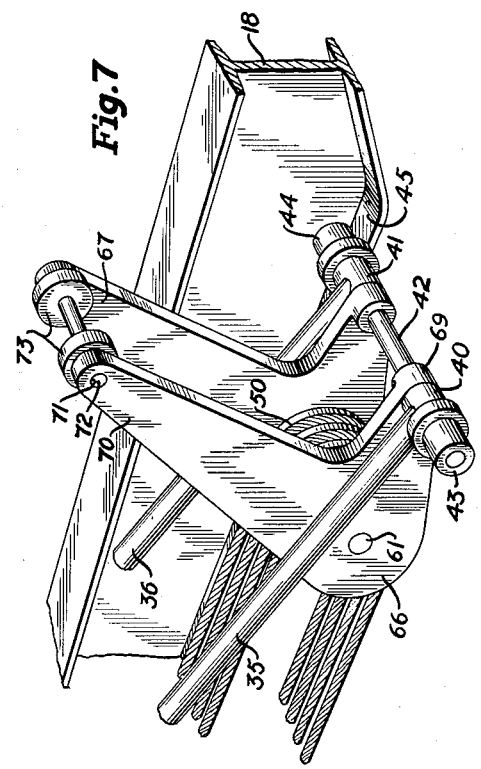

Fig. 6, a view similar to Fig. 3, of a slightly modified form of the invention; and Fig. 7, an enlarged fragmentary perspective of the lower end of the strut supporting structure of Fig. 6 and the groups of pulleys or sheave wheels carried thereby.

Briefly stated, the invention comprises a conventional truck or tractor and a novel trailer unit detachably connected thereto by means of a conventional pivotal connection or fifth wheel. The trailer unit has a sub-frame supported at its rear by multiple wheels and axles and on the sub-frame is tiltably or pivotally mounted by means of a transverse shaft a bed or body. The sub-frame is composed of spaced parallel frame members in the form of I-beams between which on the lower contiguous flanges are mounted cooperating rollers which support a shaft on which are pivoted a pair of struts one adjacent each frame member. The upper ends of the struts are pivoted to the intermediate portion of the bed or body.

The rear portion of the body forms one side of a triangle, the struts provide a second side, and the base or third side is formed by the sub-frame. The base is of variable length while the other two sides are not. Thus, when the base is shortened the body is raised or tilted and when the base is lengthened the body is lowered.

In order to move the lower ends of the struts and the shaft on which they are mounted to shorten and lengthen the base of the triangle to raise and lower the body, power means is provided comprising a windlass which for convenience may be mounted on the truck and rotatable from the power plant of the truck for winding a cable up on it or for unwinding the same therefrom. The cable is extended around pulleys or sheave wheels anchored between cross-members of the frame towards the rear end of the latter, and cooperating pulleys or sheaves are carried by the shaft on which the lower ends of the struts are pivotally mounted. The rear end of the cable is anchored to the fixed support for the pulleys or sheave wheels towards the rear end of the truck. When the windlass is operated, the cable will be wound about the same and draw the two sets of sheave wheels toward each other and move the struts to elevate the forward end of the bed or body of the trailer to discharge the contents.

The bed or body is pivoted at its rear end at sufficient height that when the body is tilted to discharge its load it will be high enough to cause a high pile to be formed over a comparatively small area instead of scattered or spread over a much larger area.

The pivot pins between the struts and the trailer body and between the rear end of the frame and the bed or body may be taken out to permit the bed or body to be removed so that the sub-frame may be employed for hauling other materials. Likewise, the trailer unit may be readily attached to or detached from the truck or tractor in the usual manner since it is connected by the conventional fifth wheel.

With continued reference to the drawings a truck or tractor 10 of conventional construction is provided having front wheels 11 and rear wheels 12 with the latter of dual type to support a heavier load. A gas tank 13 is adapted to contain a supply of gasoline or other fuel for operating the power plant of the vehicle. The truck or tractor 10, is provided with a body 14, on which is mounted connecting plate 15 for supporting thereon a cooperating connecting plate 16 and forming a pivotal or fifth wheel connection.

The plate 16 is attached to and forms a support for the front end of a trailer unit including a pair of longitudinally disposed frame members 17 and 18 mounted in spaced parallel relation and connected by cross-members 19, 20 and 21. The frame members 17 and 18 are supported adjacent their rear end portions by sets of dual wheels 22 mounted on axles 23. A bed or body is likewise provided with the rear ends thereof and the rear ends of the frame members pivotally connected, the body having central longitudinal truss members 24 and 25 from the rear end of each of which is disposed a depending hinge member 26 and with a pivot pin 27 connecting the same to the rear ends of the frame members so that the body may be tilted by the raising and lowering of the front end of the same. The body may have pairs of supporting braces 28 and 29 spaced longitudinally of the body and connected to the truss members 24 and 25. Additional braces 30 may be employed so that the body will be a rigid, strong structure. The body likewise may have upright sides 31 and braces 32 as well as side members 33 and 34 which extend along the lower portion of the body at the sides as well as at the rear and front.

In order to elevate the forward end of the body to discharge its load a pair of struts 35 and 36 are provided, such struts having upper sleeved ends 37 in which is received a stub shaft or pivot pin 38. The ends of the stub shaft 38 are removably mounted in a pair of spaced parallel plates 39 which are disposed vertically within a depression on the underside of the bottom of the bed or body so that the ends of the struts 35 and 36 are pivoted to the body above the plane of the bottom of the same to increase the angularity of the struts and locate their upper ends as far as possible above the frame members and to decrease the angle between the rear portion of the bed or body and the struts and consequently reduce the amount of force necessary to move the lower end of the struts longitudinally of the frame members to shorten and lengthen the base or lower side of the triangle thus formed. The lower ends of the struts 35 and 36 are provided with sleeve ends 40 and 41 in which a stub shaft 42 is received, such shaft having rollers 43 and 44 on its outer ends which roll upon the lower inner flanges of the I-beams as shown particularly in Fig. 4, wherein the flange 45 of the I-beam 18 forms a track for the roller 44; the I-beam 17 having a corresponding flange extending towards I-beam 18 and forming a support for the roller 43. The frame members 17 and 18 are I-beams, the flanges of which perform the dual function of reinforcing and with their contiguous lower portions providing supporting tracks as will be hereinafter more fully described.

When the shaft 42 and the lower ends of the struts 35 and 36 are moved rearwardly of the vehicle to shorten the base of the triangle the bed or body will have its front end raised, and when the lower ends of the struts are moved in an opposite direction the front end of the bed or body will be lowered.

In order to supply the necessary power for operating the shaft 42 two sets of pulleys or sheave wheels may be employed, one anchored to the member 20 adjacent the rear portion of the frame and the other attached to the stub shaft 42 and with one end of the cable anchored adjacent the rear group of pulleys or sheave wheels while the other end of the cable is attached to the windlass on the forward portion of the vehicle.

Power may be supplied from the power plant of the vehicle through a driving connection such as a chain 46 to the windlass 47 to which is secured one end of an operating cable 48 which extends rearwardly of the frame members downwardly around a pulley or sheave wheel 49, then forwardly and upwardly around a pulley or sheave wheel 50, then rearwardly and downwardly around a pulley or sheave wheel 51, then forwardly and upwardly around a pulley or sheave wheel 52, then rearwardly and downwardly around a pulley or sheave wheel 53, then forwardly and upwardly around a pulley or sheave wheel 54, then rearwardly and downwardly around a pulley or sheave wheel 55; then forwardly and upwardly around a pulley or sheave wheel 56, then rearwardly where it is secured to an anchoring loop 57. The pulleys or sheave wheels towards the rear end of the vehicle are mounted on a stub shaft 58 carried by supports 59 and 60, and the other or forward group of pulleys or sheave wheels are mounted on a stub shaft 61 carried in the forward ends of arms 62 and 63 pivoted on the shaft 42. Grooved guide pulleys 64 and 65 are provided on cross member 19 for engaging and guiding cable 48 so that the cable passes substantially over the center of the fifth wheel at all times permitting the dump vehicle to be operated in all positions of the tractor.

In order to implement the initial elevational movement of the body of the trailer, as shown in Figs. 6 and 7, the transversely disposed stub shaft carrying the forward grouping of pulleys or sheave wheels has its opposite ends journaled in the intermediate portions of a pair of bell crank levers having their short and long lever arms disposed substantially at right angles to each other and with the short lever arms journaled on the transverse support, which moves along the track-forming flanges of the frame, and with rollers adjacent the outer extremities of the longer arms, which rollers engage the underside of the body of the trailer and as the bell crank levers rotate they provide added elevating leverage at the start of the raising of the trailer body. This rotating of the bell crank levers continues until the long lever arms reach a position slightly inclined to the vertical, so that when the body is lowered these arms will be returned substantially to horizontal position.

In the structure of Figs. 6 and 7 the lower ends of the struts 35 and 36 are supported in a slightly different manner than in the preceding figures in which the upper ends of the struts are located in a recess on the underside of the bed or body. In the present embodiment on account of the manner in which the lower ends of the struts are supported it is unnecessary to pivot the upper ends of the struts above the plane of the body to increase their angularity. In both embodiments of the invention the lower ends of the struts 35 and 36 are provided with sleeve ends 40 and 41 in which the stub shaft 42 is received, such shaft having rollers 43 and 44 on its outer ends which roll along the lower inner flanges of the I-beams which form the frame of the trailer similar to that illustrated in Fig. 4 wherein the flange 45 of the I-beam 18 forms a track for the roller 44, the I-beam 17 having a corresponding flange extending toward the I-beam 18 and forming a support for the roller 43.

In the modification of the construction shown in Figs. 6 and 7 the forward group of pulleys or sheave wheels is mounted on a stub shaft 61 carried by the L-shaped brackets forming bell crank levers 66 and 67 with arms disposed substantially at right angles one to the other with the short arm 68 of the lever 66 terminating in a bearing sleeve 69 and with the long arm 70 of the lever providing a bearing sleeve 71 for a shaft 72 having its opposite end similarly journaled in the cooperating lever arm 67 and with such shaft provided with spaced body engaging rollers 73. Thus, when the opposed long arms of the levers are in substantially horizontal position beneath the body in its lowered position as indicated in dotted lines in Fig. 6, and power is applied to the cable to move the forward group of pulleys or sheave wheels and supporting shaft 61 rearwardly such long arms will move from a substantially horizontal to a substantially upright position about the shaft 61 as a pivot before the rollers 43 and 44 and the shaft 42 supported thereby are moved rearwardly along the track between the sides of the frame of the trailer thus providing initial leverage at the start of the operation. When the body of the trailer is lowered, the reverse operation will take place.

At the beginning of the lifting operation the direction of pull on the lower end of the struts 35 and 36 is only slightly above the shaft on which the truck body is pivoted. Thus, the leverage for raising the truck body by moving the struts rearwardly is at its minimum. However, the pull on the bell crank lever 66 tends to pivot the bell crank about the shaft 42, the forward motion of which is stopped by the upwardly and forwardly inclined portion of the track. This causes the horizontally disposed longer arm 70 to rotate to substantially upright position thus elevating the body of the truck by applying a lifting force close to the forward end of the body where the lever arm is relatively long. After the long arm of the bell crank lever is in the upright position indicated in Fig. 6 the struts 35, 36 have much greater leverage for lifting the body than at the start and the operation therefore can be initiated and continued without difficulty.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A trailer vehicle comprising a sub-frame supported at its rear by a ground engaging wheel and having means at its forward end for engagement with a tractor, said sub-frame having a guide track ledge adjacent the lower edge thereof, a dump body pivotally connected adjacent its rear end to the sub-frame with the pivot appreciably below the upper edge of the sub-frame, strut means pivotally mounted at one end to the dump body intermediate the ends thereof and with the pivotal mounting being appreciably above the bottom of the dump body, track engaging means mounted on the other end of said strut means and riding on the track ledge, lever mechanism pivotally mounted on said track engaging means and movable with the lower end of said strut means, a first plurality of pulleys rotatably mounted on said lever mechanism, a second plurality of pulleys mounted on said sub-frame intermediate the other ends of said strut means and the pivotal connection between said body and sub-frame, a cable reeved over said first and second plurality of pulleys a plurality of times to provide a high mechanical advantage, said cable operating said lever mechanism to rotate the same and cause it to first engage the body to elevate said body and thereafter to move the lower end of said struts along said track ledge to continue elevation of said body.

2. A cable operated dump trailer comprising a frame having opposed inwardly extending longitudinally inclined track forming portions along the facing edges thereof, a dump body on said frame pivoted adjacent to its rear end thereto, a pair of struts having adjacent ends pivotally connected to said dump body in spaced relation to the first pivot and having their other ends movable along said track forming portions, cable means for producing movement between the ends of said struts and said track to raise and lower said body, means for imparting an initial lifting action to said body prior to movement of said struts along said track, said means comprising a bell crank lever with one arm having a connection with the ends of said struts which are movable along said track and the other arm located beneath said body and movable from a substantially horizontal position to an upright position to elevate said body, and with said cable means connected to said bell crank lever for operating the same to first raise said body and thereafter to move the ends of said struts along said track.

3. In combination a cable operated dump body, a frame pivotally supporting said body adjacent one end and having a longitudinally disposed inclined track, a strut pivoted to said body in spaced relation to said first pivot and having one end movable along said track, and a bell crank lever pivotally associated with the last mentioned end of said strut and having an arm adapted to move from a substantially horizontal to an upright position and to engage and lift said body during such movement, and means for subsequently moving the lower end of said strut to change the angular position of the strut and additionally raise said body.

4. In combination a vehicle frame, a drum body on said frame pivoted at one end thereof, a strut pivoted to said body in spaced relation to said first pivot and movable from a position approaching the horizontal to a substantially upright position, said frame having a track disposed along its length, a bell crank lever having one arm pivoted to move with the lower end of said strut along said track and having its other arm provided with a portion movable from a lower to a higher position, and means whereby force may be applied to said bell crank lever to cause said other arm to move toward said higher position and to engage and elevate said body and thereafter to move said lower end of the struts along said track to continue to elevate said body.

5. A vehicle unit comprising a cable operated dump body member, a frame member pivotally supporting said body adjacent one end thereof, a longitudinally disposed trackway on one of said members, a strut having a pivotal connection at one end thereof in one of said members in spaced relation to said frame member pivot and having its other end movable along said trackway, cable means on said vehicle unit, a bell crank lever pivotally connected to the last mentioned end of said strut and having an arm adapted to move by said cable means from one position to a position at a substantial angle thereto and to lift said body member during such movement, and cable means being operable for subsequently moving the last mentioned end of the strut to change the angular position of the strut and lever to additionally raise said body member.

6. A truck tractor trailer dump unit including a truck tractor having a conventional fifth wheel coupling unit and a winch, a trailer having a conventional cooperating fifth wheel coupling unit, said trailer comprising a chassis frame having spaced substantially parallel channel members, said channel members having their lower flanges extending inwardly toward each other to form trackways with a portion of said trackways being inclined, a dump body on said chassis frame pivotally connected adjacent its rear end of said parallel channel members, a pair of spaced struts pivotally connected to said dump body intermediate the ends thereof, a shaft pivotally extending through the lower ends of the struts and having rollers on its outer ends, said rollers being movable on said trackways to raise and lower said dump body, cable means for producing movement between the ends of said struts and said tracks to raise and lower said body, means for imparting an initial lifting action to said body prior to movement of said struts along said tracks and comprising a bell crank lever with one arm having a connection with the ends of said struts which are movable along said tracks and the other arm located beneath said body and movable from a substantially horizontal position to an upright position to elevate said body, and with said cable means connected to said bell crank lever for rotating the same to first raise said body and thereafter to move the ends of said struts along said track, and a force multiplication mechanism including said cable means connected to the chassis and to the bell crank lever with the lower ends of the struts to raise said dump body.

7. A trailer dump unit comprising a chassis having spaced substantially parallel channel members having their lower flanges extending inwardly toward each other to form trackways, a dump body on said chassis pivotally connected adjacent its rear end to said parallel channel members, a pair of spaced struts pivotally connected to said dump body intermediate the ends thereof, a shaft carried at the lower ends of the struts and having rollers on its outer ends, said rollers being movable on said trackways to raise and lower said dump body, a bell crank lever pivotally associated with the lower ends of said struts and having an arm adapted to move from a substantially horizontal to an upright position and to engage and lift said body during such movement, and means for moving the lower ends of said struts and bell crank lever to change the angular position of the struts and additionally raise said body.

8. The combination of a tractor trailer dump unit including a tractor having a conventional fifth wheel coupling unit and a winch, a trailer having a conventional cooperating fifth wheel coupling unit, said trailer comprising a chassis frame having spaced substantially parallel members forming channels, said members being supported on conventional wheels near their rear ends and attached to said cooperating fifth wheel coupling unit at their forward ends, trackways enclosed within the channels formed by said spaced parallel members, a dump body on said frame pivotally connected adjacent its rear end to said parallel members, a spaced pair of struts pivotally connected to said dump body intermediate the ends thereof, said struts having rollers on their lower ends, said rollers being movable on said trackways to raise and lower said body, cable means connected with said winch for producing movement between the ends of said struts and said tracks to raise and lower said body, means for imparting an initial lifting action of said body prior to movement of said struts along said tracks and comprising a bell crank lever pivotally associated with the lower ends of said struts and having an arm adapted to move from a substantially horizontal to an upright position and to engage and lift said body during such movement, and with said cable means connected to said bell crank lever for operating the same to change the angular position of the struts and additionally raise said body.

9. A vehicle including a dump unit, said vehicle comprising a chassis frame having spaced substantially parallel channel members supported on conventional wheels near their rear ends, the lower flanges of said members extending toward each other forming trackways, a portion of said trackways being inclined, a dump body on said frame pivotally connected adjacent its rear end to said parallel members, said dump body having spaced parallel longitudinal beams extending between ends of said body, said beams overlying said frame members when said body is in a horizontal position, a pair of struts pivotally connected to said dump body intermediate the ends thereof and between said beams, a shaft extending between the other ends of said struts and having rollers thereon, said rollers being movable on said trackways to raise and lower said body, power means including a cable connected to the lower ends of said struts and to the chassis frame, winch means on the vehicle for applying tension to said cable, means for imparting an initial lifting action to said body prior to movement of said struts along said track and comprising a bell crank lever with one arm having a connection with the ends of said struts which are movable along said track and the other arm located beneath said body and movable from a substantially horizontal to an upright position to elevate said body and with said cable connected to said bell crank lever for rotating the same to first raise said body and thereafter to move the ends of said struts along said track.

10. A truck tractor trailer dump unit including a truck tractor having a conventional fifth wheel coupling unit and a winch, a trailer having a conventional cooperating fifth wheel coupling unit, said trailer comprising a chassis frame having spaced substantially parallel members forming inwardly extended channels, said members being supported on conventional wheels near their rear ends and attached to said cooperating fifth wheel coupling unit at their forward ends, trackways enclosed within the channels formed by said spaced parallel members, a dump body on said frame pivotally connected adjacent its rear end to said parallel members, a spaced pair of struts pivotally connected to said dump body intermediate the ends thereof, a shaft extending between the opposite ends of said struts and having rollers thereon, said rollers being movable on said trackways to raise and lower said body, said cooperating fifth wheel coupling unit having a cable guide, a cable connected between said winch and a force multiplication mechanism consisting of spaced means, one connected to the chassis frame and the other to said shaft and movable therewith, said cable extending through said guide for moving the lower ends of said struts to raise said body, and lever means movable with said shaft for imparting an initial lifting action to said body prior to movement of said struts along said trackways.

References Cited in the file of this patent

UNITED STATES PATENTS

| 840,854 | Kuhielski | Jan. 8, 1907 |
| 1,294,173 | Rose | Feb. 11, 1919 |
| 1,631,627 | Egholm | June 7, 1927 |
| 2,174,956 | Allison | Oct. 3, 1939 |
| 2,496,350 | Lundell | Feb. 7, 1950 |
| 2,542,795 | Clement | Feb. 20, 1951 |
| 2,593,776 | Margala | Apr. 22, 1952 |

FOREIGN PATENTS

| 22,335 | Australia | July 23, 1930 |